Jan. 4, 1949.   H. D. ROOP   2,458,099
IONIZATION CHAMBER
Filed Oct. 19, 1945

INVENTOR
HAROLD D. ROOP
BY
HARRIS, KIECH, FOSTER & HARRIS

FOR THE FIRM
ATTORNEYS

Patented Jan. 4, 1949

2,458,099

UNITED STATES PATENT OFFICE 2,458,099

IONIZATION CHAMBER

Harold D. Roop, Los Angeles, Calif.

Application October 19, 1945, Serial No. 623,334

10 Claims. (Cl. 250—83.6)

My invention relates to a novel method and apparatus for increasing ionization effects in irradiated gases and has particular reference to the increase in sensitivity of X-ray sensitive devices, such as ionization chambers.

X-ray are widely used in the examination and inspection of engineering material to determine the structure thereof or the flaws therein. The customary methods of application are confined to radiography or fluoroscopy. I have found that the expensive, complicated, and elaborate equipment used in radiography or the fluorescent screens and handling devices employed in industrial fluoroscopy may be replaced usually by a simple means for transmitting a beam of X-rays through the material or specimen in question and interposing in the emergent beam an X-ray sensitive device, such as an ionization chamber. For example, in my copending application, Serial No. 623,335, filed October 19, 1945, is disclosed a comparative system whereby the intensity of the aforesaid emergent beam is compared in intensity with a similar beam transmitted through a standard piece of material or a reference specimen. In such a system, two ionization chambers may be disposed respectively in the emergent beams and their outputs compared to indicate whether the material or specimen in question is acceptable as compared with the standard material or specimen. I have found that such an arrangement constitutes a sensitive and reliable means whereby X-rays may be employed, not only to reveal quickly and automatically the presence of voids, flaws, inclusions, etc., in any material, but also to perform functions practially impossible of achievement by radiography or fluoroscopy.

It is desirable to employ X-ray sensitive devices of maximum sensitivity. The present invention is concerned with an improved ionization chamber and includes among its objects the provision of a novel method and apparatus for increasing the sensitivity of previously-known ionization chambers, as well as the design of an extremely compact multiple-element ionization chamber which enables a saturated condition to be maintained in a large volume of gas without the use of excessively high voltages. Generally stated, it is an object of the present invention to increase the effectiveness of ionizing radiations and to increase the ionization of an irradiated gaseous substance between charged electrodes.

I have found that the effect of ionizing radiations on a substance, such as a gas, can be markedly and unexpectedly increased by appropriate employment of a fluorescent material or a phosphor in contact with the substance. A phosphor may be defined as a material that exhibits luminescence when in a state of excitation. When the intensity of the radiation emitted by a material exceeds the intensity of the radiation of the same wave length from a black body of the same temperature, the radiation may be termed "luminescence." The phosphors with which the present invention is particularly concerned are those which emit considerable amounts of ionizing radiation in the far ultra violet region. Some of the phosphors presently available have this property, albeit that they are designed primarily to convert invisible radiation into a visible form. Further, however, phosphors can be designed to emit a preponderance of ultra violet radiation and these are of even greater value in the present invention. When such phosphors are excited by X-rays, a supplementary ionizing radiation of considerable intensity can be generated. Thus, by disposing such a phophor in contact with a gas or other ionizable substance and exposing the phosphor and the substance to ionizing radiation, it is possible greatly to increase the resulting ionization.

It is an object of the present invention to employ such a phophor to increase the effect of ionizing radiations upon a substance, such as a gas. It is another object to employ such a phosphor in contact with an irradiated gaseous substance. Still another object of the invention is to employ coatings of such a phosphor in the construction of ionization chambers or other radiation-responsive devices to increase greatly the sensitivity thereof.

Other objects and advantages of the invention will be evident to those skilled in the art from the following description of an exemplary embodiment.

Referring to the drawing, which suggests one embodiment for purpose of illustration:

Figure 1:
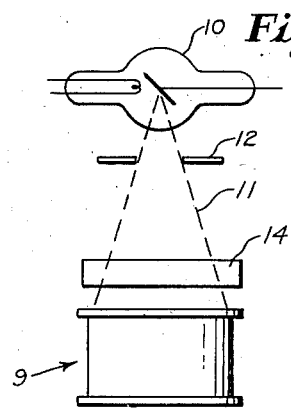
Fig. 1 is a utility view showing an ionization chamber of the invention used as an X-ray sensitive device.

Referring particularly to Fig. 1, the ionization chamber of the invention is indicated generally by the numeral 9 and receives radiation from any suitable source, such as an X-ray tube 10. As suggested in Fig. 1, this X-ray tube 10 emits a beam of electromagnetic radiation, suggested by X-ray beam 11. If desired, the boundaries of the beam may be determined by an aperture in a collimating or beam-forming plate 12, although in other instances this is not necessary. The beam 11 is shown as being directed toward a test specimen 14, which may be a specimen to be inspected or gauged, and which absorbs a portion of the incident electromagnetic energy and transmits the remainder to the ionization chamber 9 whose conductance increases with the intensity of the transmitted or emergent radiation. The usual ionization chamber contains a pair of spaced plate electrodes bounding a gas-filled space and energized by a high voltage unidirectional source of potential. A saturating voltage is used and the ions produced by the X-ray irradiation of the gas are caused to flow to one of the electrodes to establish a measurable electric current therebetween which varies with the intensity of the emergent or transmitted beam and which can be used to determine the intensity of this emergent or transmitted beam, either directly or by comparative methods.

Figure 2:
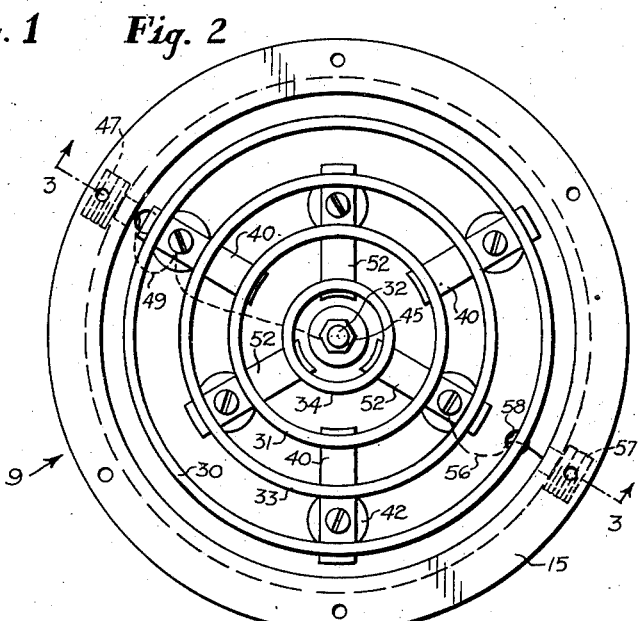
Fig. 2 is a top view of the ionization chamber with the cover removed.
Figure 3:
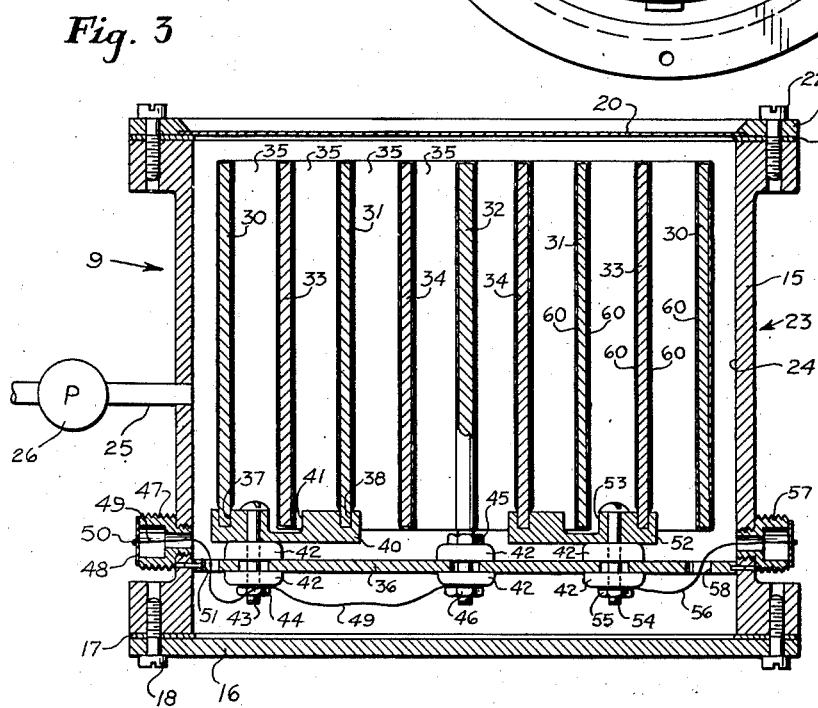
Fig. 3 is a vertical sectional view of the ionization chamber, taken along the line 3—3 of Fig. 2.

The details of the preferred ionization chamber 9 are best shown in Figs. 2 and 3. Referring thereto, the ionization chamber comprises a flanged cylindrical side wall 15 closed at its lower end by a lower plate 16 sealed by a gasket 17 and retained in place by screws 18 threaded into the lower flange. The upper end of the side wall 15 is closed by a ring 19 providing an opening transversed by a thin non-porous window 20 formed of any metal or other material which will transmit the X-rays of the incident or transmitted beam without undue absorption. The ring 19 is sealed with respect to the upper flange of the side wall 15 by a gasket 21 and is held in place by screws 22. The structure thus far described comprises a housing, indicated generally by the numeral 23 and providing a chamber 24 which is adapted to be filled with a gaseous substance confined therein, either before attachment of the upper cover structure or delivered thereto by any suitable means, such as a pipe 25, the flow being aided, if desired, by a pump 26.

Inside the housing 23 are disposed two sets or systems of oppositely-charged electrodes, respectively designated as a primary electrode system and a secondary electrode system. The primary electrode system is shown as comprising an interstitial electrode structure including coaxial tubular electrodes 30 and 31, as well as a central rod electrode 32. The secondary electrode system is shown as comprising an interstitial electrode structure including coaxial tubular electrodes 33 and 34, respectively interposed between electrodes 30, 31 and 31, 32 in a manner to provide a plurality of concentric annular spaces 35 of substantially equal width.

All of the electrodes are coaxially supported from a transverse plate or partition 36 secured and electrically connected to the side wall 15. The tubular electrodes 30 and 31 are shown as resting in annular grooves 37 and 38 formed in each of three metal support members 40. Each member 40 provides a groove 41 substantially wider and deeper than the grooves 37 and 38 to receive the lower end of the tubular electrode 33, with an intervening space sufficient to prevent electrical contact. The members 40 are spaced equally about the central axis of the rod electrode 32, as shown in Fig. 2, and each member is supported by a pair of porcelain bushings 42 on opposite sides of the partition 36, which bushings are held with respect thereto and with respect to the member 40 by a screw 43 providing a clamping nut 44. The central rod electrode 32 is similarly insulated by two of the bushings 42 clamped between nuts 45 and 46 threaded to the rod.

These three electrodes 30, 31, and 32 of the primary electrode system are electrically connected together and to one terminal of a source of unidirectional saturating voltage, not shown. This may be accomplished by a suitable cable connection, not shown, joined to a threaded member 47 providing a chamber closed by a thin disc of insulating material 48. A conductor 49 terminates in a contact 50 at the center of this disc and extends through an opening 51 of the partition 36 to connect with the electrodes of the primary electrode system, as by being electrically connected to and retained by the nuts 46 and 46.

The tubular electrodes 33 and 34 of the secondary electrode system are supported by three similarly grooved supporting members 52 disposed equidistant about the axis of the rod electrode 32 and between the members 40, as best shown in Fig. 2. Each of the members 52 provides a large groove 53 receiving, without electrical contact, the lower end of the tubular electrode 31, and each is supported by a pair of the bushings 42 held in place by screw 54 and nut 55. The electrodes 33, 34 are thus electrically connected together and to the source of unidirectional potential through a conductor 56 extending from beneath the nut 55 through a threaded member 57 constructed similarly to the member 47 previously described, the conductor 56 passing through an opening 58 of the partition 36.

Due to the electrical connections involved, high electrostatic fields are established across each of the concentric annular spaces 35. While various gradients can be employed, about 750 volts per centimeter will be found quite satisfactory. The construction thus far described can be employed as an ionization chamber without the hereinafter described coatings and it has many advantages over conventional ionization chambers due to the multiple-element construction and to the fact that this construction enables a saturated condition to be maintained in a large volume of gas without the use of excessively high voltages. This arrangement also makes possible the construction of very small ionization chambers performing, to all intents and purposes, the function of considerably larger chambers of conventional design. It should be understood that the invention is not limited to the particular number of concentrically-positioned electrodes suggested in Figs. 2 and 3 as this number can be substantially increased; also, that the thickness of the electrodes in Fig. 3 has been greatly exaggerated for purpose of clarity in illustration. In practice, the tubular electrodes are very thin. For example, if formed of aluminum or other metal, they may have a thickness as small as about .005".

The gaseous substance within the chamber 24 of the housing 23 may be air or, preferably, a gaseous substance of relatively high molecular weight, such as Krypton, Xenon, etc., or a relatively dense vapor, such as carbon tetrachloride, etc. If the device is used without the hereinafter described phosphor coatings, the X-rays of the incident or transmitted beam will pass through the window 20 and ionize the gaseous substance in the intercommunicating annular spaces 35. These ions will move to one or the other set of electrodes, depending upon the circuit connections of the ionization chamber, and the resulting ionization currents, totalled in the current flow through conductors 49, 56 will be a function of the intensity of the transmitted or incident beam of radiation.

The sensitivity of the device hereinafter disclosed can be remarkably increased by disposing a suitable phosphor within the chamber 24 and preferably in contact with the gaseous substance therein. As previously mentioned, the preferred phosphors are materials excitable by the incident radiation to produce relatively large quantities of radiation in the ultra violet range, irrespective of whether some portion of this radiation is in the visible spectrum. Even commonly-known phosphors can be employed to produce a very marked increase in sensitivity, e. g., zinc sulfide (ZnS), calcium tungstate (CaWO₄), anthracene, quinine sulfate, etc. A phosphor composed of zinc cadmium sulfate activated by silver and quenched with nickel is particularly effective, and other phosphors can be specifically compounded to accentuate the property of producing relatively large quantities of radiation in the ultra violet range, and such phosphors will be found even more effective for the purposes of the present invention.

There are various ways of maintaining such a phosphor in contact with the gaseous substance. In the preferred embodiment, thin coatings of the phosphor are applied on all or at least some of the electrode surfaces. In Fig. 3, these phosphor coatings are indicated generally by the numeral 60, being shown greatly exaggerated in thickness for purpose of clarity and being shown as applied to the internal surface of the tubular electrode 30, the internal and external surfaces of the tubular electrodes 31, 33, and 34, and the external surface of the rod electrode 32. In general, the coatings are preferably applied to those electrode surfaces which receive or face the incident radiation, although all of the electrode surfaces can be thus coated, if desired.

The phosphor-coated embodiment of the invention operates as follows. As before, the incident or transmitted radiation, whether or not varied by passage through the material or specimen 14 to include secondary radiation, enters the chamber 24 through the window 20. As before, a portion of this incident or transmitted radiation is intercepted by the molecules of the gaseous substance to ionize same and establish a small ionization current through conductors 49, 56. However, this portion of the radiation is small as compared with the remaining portion of the radiation which is not thus usefully absorbed and which is available to excite the phosphor of the coatings on which it falls. Such excitation of the phosphor produces substantial quantities of ionizing radiation, hereinafter termed as a "supplementary ionizing radiation," which is available additionally to ionize the gaseous substance in much the same manner as did the incident X-rays. This supplementary ionizing radiation is of substantial intensity and the ions produced thereby will increase the ionization current through conductors 49, 56 very substantially, as will be later exemplified, with a resultant phenomenal increase in the sensitivity of an ionization chamber of given volume. With properly designed phosphors, the supplementary ionizing radiation will include large quantities of radiation in the ultra violet region and substantial quantities in the far ultra violet region, even though a portion of the radiation may be in the visible range. Also, the supplementary ionizing radiation is usually produced without perceptible rise in temperature of the phosphor.

The substantial increase in sensitivity of an ionization chamber containing such a phosphor in contact with the gaseous substance, as compared with the absence of such phosphor, can be readily demonstrated. For example, the following results have been obtained from a simple two-electrode ionization chamber, the electrodes being interstitial and consisting of two sheets of aluminum wire screen 5" x 8", the screen being composed of wire having a diameter of 0.010" with ten meshes per inch. The axis of the transmitted or incident beam of X-rays was normal to the screen electrodes, a construction which can be employed without departing from the spirit of the present invention. The following table indicates variations of the ionizing currents (reported in microamperes) with two electrode spacings ($\frac{5}{16}$" and $\frac{5}{8}$"), with the electrodes uncoated in one instance and coated in the other, two typical phosphors being employed. The ionization currents at each spacing with uncoated electrodes are taken as unity and the factors of increase for the coated electrodes are indicated in the following table:

| Electrode Spacing | Phosphor Coating | Ionization Current | Factor of Increase |
| --- | --- | --- | --- |
| Inches | | | |
| $\frac{5}{16}$ | None | 0.00075 | 1 |
| $\frac{5}{16}$ | CaWO₄ | 0.0045 | 6 |
| $\frac{5}{16}$ | ZnS | 0.0055 | 7.3 |
| $\frac{5}{8}$ | None | 0.0012 | 1 |
| $\frac{5}{8}$ | CaWO₄ | 0.0040 | 3.3 |
| $\frac{5}{8}$ | ZnS | 0.0042 | 3.5 |

The above test results are significant for a number of reasons. In the first place, they indicate remarkable increases in ionization current with the coated electrodes as compared with the uncoated electrodes. In the second place, these test results show unexpected advantages in employing narrow spacings of the phosphor-coated electrodes. In this connection, the above table shows that, with uncoated electrodes, the ionization current decreases as the spacing of the electrodes is decreased, a result which is to be expected because a lesser volume of air is present between the electrodes. In the above test results, the volume was approximately halved. However, an entirely different result was obtained by the use of phosphor-coated electrodes. Here, the total ionizing current increases as the spacing of the electrodes is decreased. The exact explanation for this phenomenon is not at present known. The phosphor, when excited, is a source of ionizing radiation and it may be that, as such, it responds to the inverse square law to some extent. Much is unknown concerning the complete spectral distribution of energy emitted by known phosphors, but it is known that some phosphors emit radiation extending far into the ultra violet range. It is also known that air has an increasingly appreciable opacity to wave lengths shorter than 2200–2000 Å. If radiation of this wave length is emitted by the phosphor used, a further explanation is provided for the increase in ionization current as the distance between the electrodes is decreased. It should be understood, however, that the invention is not limited by these possible explanations of the observed phenomena.

The above results are not limited to screen electrodes, as evidenced by the following test results when using flat plates of aluminum 0.040"

2,458,099 thick at various spacings. The following table reports the ionization current at various electrode spacings (in inches) and indicates the volume of the inter-electrode space (in cm.$^3$); the total ionization current (in microamperes) and the variation in ionization current per cubic centimeter or current density (microamperes/cm.$^3$) when employing uncoated electrodes and electrodes coated with ZnS.

| Electrode spacing | Volume interelectrode space | Ionization current, uncoated electrodes | Current density, uncoated electrodes | Ionization current, ZnS coated electrodes | Current density ZnS coated electrodes |
|---|---|---|---|---|---|
| Inches | Cubic centimeters | | | | |
| 0.8 | 56 | 0.018 | 0.000320 | 0.026 | 0.00046 |
| 0.6 | 42 | | | 0.034 | 0.00081 |
| 0.5 | 35 | | | 0.032 | 0.00091 |
| 0.4 | 28 | 0.009 | 0.000320 | 0.035 | 0.00125 |
| 0.3 | 21 | | | 0.040 | 0.00190 |
| 0.2 | 14 | 0.0046 | 0.000328 | 0.042 | 0.00300 |

From the test results reported in this table, it will be noted that, when uncoated electrodes are used, the current density is the same, within limits of experimental error, for any spacing. This is normal for any ordinary ionization chamber when the intensity of radiation is kept at a given level, as it was in the reported test runs. On the other hand, the phosphor-coated electrodes produce increased current densities (microamperes/cm.$^3$) with decreased electrode spacings. Within the range covered by these test runs and the limitations of the phosphor employed, the increase is more than six times.

In general, the efficiency of transformation of the electromagnetic energy of X-rays or other ionizing radiations into electrical energy has been increased remarkably by the invention through use of a source of supplementary radiation within the ionization chamber. Instead of allowing the majority of the incident rays to escape encountering molecules of the ionizable gas, my invention allows the useful absorption of a much greater proportion of such incident rays. Ionizing radiations are thus efficiently transformed into electrical currents which may be utilized for any purpose, e. g., they may be employed as an index of the intensity of the incident ionizing radiation.

Various modifications may be made in the exemplary embodiments disclosed hereinabove without departing from the spirit of the invention as defined in the appended claims.

I claim as my invention:

1. In an apparatus for determining the intensity of an ionizing radiation, the combination of: a pair of electrodes bounding a space containing a gaseous substance and adapted to be energized by a source of potential to maintain an electric field in said space; and a phosphor in contact with said gaseous substance in said space in a position to be exposed to the incident ionizing radiation, said phosphor being excitable by said ionizing radiation to produce ultra violet radiation.

2. An ionization chamber for exposing a gaseous substance to an ionizing radiation, said ionization chamber including: a housing for said gaseous substance; a phosphor within said housing in contact with said gaseous substance, said phosphor being excitable by said ionizing radiation to produce ultra violet radiation; and means for establishing an electric field in said housing.

3. An ionization chamber for exposing a gaseous substance to an ionizing radiation, said ionization chamber including: a housing containing said gaseous substance and providing a pair of electrodes electrically insulated from each other anud adapted for connection to a source of potential to establish an electrostatic field therebetween, at least a portion of said gaseous substance being disposed between said electrodes; and a phosphor between said electrodes in contact with said gaseous substance, said phosphor being excitable by said ionizing radiation to produce ultra violet radiation.

4. In a device for exposing a gaseous substance to an ionizing radiation, the combination of: a housing containing said gaseous substance and providing a pair of electrodes electrically insulated from each other and adapted for connection to a source of potential to establish an electrostatic field therebetween, at least a portion of said gaseous substance being disposed between said electrodes; and a phosphor coating on at least a portion of one of said electrodes and in contact with said gaseous substance, said phosphor being excitable by said ionizing radiation to produce ultra violet radiation.

5. An ionization chamber as defined in claim 3, in which said phosphor is a material excitable by X-rays to produce relatively large quantities of radiation in the ultra violet range.

6. An ionization chamber as defined in claim 4, in which said phosphor is a material excitable by X-rays to produce relatively large quantities of radiation in the ultra violet range.

7. In a device for exposing a gaseous substance to an ionizing radiation, the combination of: an interstitial electrode structure adapted to be disposed in the path of said ionizing radiation, said interstitial electrode structure being coated with a phosphor, said phosphor being excitable by said ionizing radiation to produce ultra violet radiation; and means for establishing an electrostatic field adjacent said interstitial electrode structure.

8. In a device for measuring the intensity of an ionizing radiation, the combination of: a housing adapted to receive incident ionizing radiation from a beam thereof; a relatively dense gaseous substance in said housing to receive and intercept a portion of said incident radiation to produce ions; a phosphor in said housing in contact with said gaseous substance to receive and intercept another portion of said incident radiation, said phosphor being excitable by such radiation to produce a supplementary ionizing radiation emitted from said phosphor to produce additional ions in said gaseous substance; and means for establishing an electrostatic field in said gaseous substance to accelerate said ions and establish an ionization current.

9. An ionization chamber for the measurement of intensity of an ionizing radiation, said ionization chamber including: a housing providing an axis and including means for confining a gaseous substance therein, said housing including a thin window traversing said axis for transmitting the ionizing radiation to the interior of said housing and to the gaseous substance therein; two electrode sets in said housing, each set comprising a plurality of tubular electrodes concentric with said axis, the tubular electrodes of one set bisecting the spaces between the tubular electrodes of the other set to provide a plurality of small-width inter-electrode spaces; means for insulating the electrode sets from each other whereby a high potential difference can be maintained therebetween to establish electric fields in said inter-electrode spaces; and a coating of a phosphor on at least some of said tubular electrodes to receive incident radiation transmitted through said window, said phosphor being excitable by such radiation to produce ultra violet radiation and thus produce a supplementary ionizing radiation for ionizing said gaseous substance.

10. An ionization chamber as defined in claim 9 including means for insulating both electrode sets from said housing and including a pair of terminal means connected to said housing and conductors respectively connecting said terminal means to said electrode sets.

HAROLD D. ROOP.

REFERENCES CITED

The following references are of record in the file of this patent:

UNITED STATES PATENTS

| Number | Name | Date |
|---|---|---|
| 2,197,453 | Hassler | Apr. 16, 1940 |
| 2,383,478 | Friedman et al. | Aug. 28, 1945 |

FOREIGN PATENTS

| Number | Country | Date |
|---|---|---|
| 533,354 | Germany | Sept. 11, 1931 |
| 550,700 | Germany | May 17, 1932 |

OTHER REFERENCES

Dement—Fluorochemistry, 1945, page 527. (Copy in Div. 3.)

Certificate of Correction

Patent No. 2,458,099.   January 4, 1949.

HAROLD D. ROOP

It is hereby certified that errors appear in the printed specification of the above numbered patent requiring correction as follows:

Column 1, line 6, for "X-ray" read *X-rays*; column 6, line 35, in the table under the heading "Phosphor Coating" for "CaWO₂", read *CaWO₄*; column 8, line 4, claim 3, for "anud" read *and*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*